US012794032B2

(12) United States Patent
Yamada et al.

(10) Patent No.: US 12,794,032 B2
(45) Date of Patent: Nov. 10, 2026

(54) METHOD FOR RECOVERING LITHIUM FROM WASTE LITHIUM-ION BATTERIES

(71) Applicant: ASAKA RIKEN CO., LTD., Koriyama (JP)

(72) Inventors: Keita Yamada, Koriyama (JP); Yukio Sakuma, Koriyama (JP); Taro Hiraoka, Koriyama (JP)

(73) Assignee: Asaka Riken Co., Ltd., Fukushima (JP)

( * ) Notice: Subject to any disclaimer, the term of this patent is extended or adjusted under 35 U.S.C. 154(b) by 362 days.

(21) Appl. No.: 18/688,440

(22) PCT Filed: Sep. 30, 2022

(86) PCT No.: PCT/JP2022/036663
§ 371 (c)(1),
(2) Date: Mar. 1, 2024

(87) PCT Pub. No.: WO2023/054667
PCT Pub. Date: Apr. 6, 2023

(65) Prior Publication Data

US 2025/0007022 A1 Jan. 2, 2025

(30) Foreign Application Priority Data

Sep. 30, 2021 (JP) ................................ 2021-161272
Dec. 7, 2021 (JP) ................................ 2021-198433
(Continued)

(51) Int. Cl.
*H01M 10/54* (2006.01)
*C22B 3/26* (2006.01)
(Continued)

(52) U.S. Cl.
CPC ............... *H01M 10/54* (2013.01); *C22B 3/26* (2021.05); *C22B 7/007* (2013.01); *C22B 26/12* (2013.01); *C25B 1/16* (2013.01)

(58) Field of Classification Search
CPC . C22B 3/26; C22B 7/00; C22B 26/12; H01M 10/54; C25B 1/16
See application file for complete search history.

(56) References Cited

U.S. PATENT DOCUMENTS 6,514,311 B1 2/2003 Lin et al.
8,298,502 B2 10/2012 Yamaoka et al.
(Continued)

FOREIGN PATENT DOCUMENTS

CA 3 085 965 A1 8/2019
CN 108517409 A 9/2018
(Continued)

OTHER PUBLICATIONS

Partial Supplementary European Search Report dated Mar. 17, 2026 issued in the corresponding EP Patent Application No. 23811917.6.
(Continued)

*Primary Examiner* — Mayla Gonzalez Ramos
(74) *Attorney, Agent, or Firm* — Carrier, Shende & Associates P.C.; Joseph P. Carrier; Fulchand P. Shende

(57) ABSTRACT

Provided is a method for recovering lithium from waste lithium-ion batteries that can recover lithium at a high recovery rate and enables resource circulation. In the method for recovering lithium from waste lithium-ion batteries, active material powder obtained by pre-processing waste lithium-ion batteries is dissolved in a mineral acid, an alkali metal hydroxide is added to the obtained acid solution, and then at least one metal excluding lithium, out of the metals contained in the active material powder, is separated by solvent extraction to obtain a first alkali metal salt aqueous
(Continued)

solution. The first alkali metal salt aqueous solution is electrolyzed using an ion exchange membrane. An alkali metal hydroxide aqueous solution obtained by the electrolysis is used as the alkali metal hydroxide to be added to the acid solution, or used for the solvent extraction. An acid obtained by the electrolysis is used as the mineral acid.

11 Claims, 7 Drawing Sheets

(30) Foreign Application Priority Data

Jan. 14, 2022 (JP) ................................ 2022-004526
Jan. 17, 2022 (JP) ................................ 2022-005152

(51) Int. Cl.
*C22B 7/00* (2006.01)
*C22B 26/12* (2006.01)
*C25B 1/16* (2006.01)

(56) References Cited

U.S. PATENT DOCUMENTS

| | | | |
|---|---|---|---|
| 10,807,879 | B2 | 10/2020 | Ito et al. |
| 10,865,462 | B2 | 12/2020 | Ito et al. |
| 11,286,170 | B2 | 3/2022 | Sharma |
| 2004/0074774 | A1 | 4/2004 | Chang et al. |
| 2014/0227154 | A1 | 8/2014 | Harrison |
| 2018/0147531 | A1 | 5/2018 | Park et al. |
| 2019/0084839 | A1 | 3/2019 | Ito et al. |
| 2019/0233297 | A1 | 8/2019 | Kim et al. |
| 2020/0044295 | A1 | 2/2020 | Arakawa et al. |
| 2021/0316998 | A1 | 10/2021 | Ariyoshi et al. |
| 2021/0395859 | A1 | 12/2021 | Ding |
| 2022/0045375 | A1 | 2/2022 | Goda et al. |
| 2022/0396852 | A1 | 12/2022 | Nishikawa et al. |
| 2023/0250507 | A1 | 8/2023 | Lee et al. |
| 2023/0312369 | A1 | 10/2023 | Arakawa et al. |

FOREIGN PATENT DOCUMENTS

| | | | |
|---|---|---|---|
| CN | 110512080 | A | 11/2019 |
| CN | 111041217 | A | 4/2020 |
| CN | 111394745 | A | 7/2020 |
| CN | 111778401 | A | 10/2020 |
| CN | 111994925 | A | 11/2020 |
| CN | 113039295 | A | 6/2021 |
| JP | H10-287864 | A | 10/1998 |
| JP | H11-185834 | A | 7/1999 |
| JP | 2001-096236 | A | 4/2001 |
| JP | 2001-508925 | A | 7/2001 |
| JP | 2003-157913 | A | 5/2003 |
| JP | 2004-142986 | A | 5/2004 |
| JP | 2004-307983 | A | 11/2004 |
| JP | 2005-042189 | A | 2/2005 |
| JP | 2009-269810 | A | 11/2009 |
| JP | 2010-229534 | A | 10/2010 |
| JP | 2010-277868 | A | 12/2010 |
| JP | 2011-031232 | A | 2/2011 |
| JP | 2011-032151 | A | 2/2011 |
| JP | 5138640 | B2 | 2/2013 |
| JP | 2015-103320 | A | 6/2015 |
| JP | 2015-183292 | A | 10/2015 |
| JP | 2016-113672 | A | 6/2016 |
| JP | 2016-186113 | A | 10/2016 |
| JP | 2016-186118 | A | 10/2016 |
| JP | 2018-502995 | A | 2/2018 |
| JP | 2018-520971 | A | 8/2018 |
| JP | 2019-081953 | A | 5/2019 |
| JP | 2019-169309 | A | 10/2019 |
| JP | 2019-173106 | A | 10/2019 |
| JP | 2020-035723 | A | 3/2020 |
| JP | 2020-072032 | A | 5/2020 |
| JP | 2020-132950 | A | 8/2020 |
| JP | 2020-164969 | A | 10/2020 |
| JP | 2020-535323 | A | 12/2020 |
| JP | 6801090 | B2 | 12/2020 |
| JP | 6835820 | B2 | 2/2021 |
| JP | 2021017627 | A | 2/2021 |
| JP | 6869444 | B1 | 5/2021 |
| JP | 7060899 | B1 | 4/2022 |
| JP | 7084669 | B1 | 6/2022 |
| JP | 7097130 | B1 | 7/2022 |
| KR | 2009-0087801 | A | 8/2009 |
| KR | 20120063072 | A | 6/2012 |
| KR | 20210080379 | A | 6/2021 |
| WO | 2017/159743 | A1 | 9/2017 |
| WO | 2017/159745 | A1 | 9/2017 |
| WO | 2018/070726 | A1 | 4/2018 |
| WO | 2019/060996 | A1 | 4/2019 |
| WO | 2020/092157 | A1 | 5/2020 |
| WO | 2020/109045 | A1 | 6/2020 |
| WO | 2021/018372 | A1 | 2/2021 |
| WO | 2021181997 | A1 | 9/2021 |
| WO | 2021/215521 | A1 | 10/2021 |
| WO | 2021/256732 | A1 | 12/2021 |
| WO | 2023/176545 | A1 | 9/2023 |
| WO | 2023/183177 | A1 | 9/2023 |
| WO | 2023/195533 | A1 | 10/2023 |
| WO | 2023/229045 | A1 | 11/2023 |

OTHER PUBLICATIONS

Tyler OR et al., "Recycling of mixed cathode lithium-ion batteries for electric vehicles: Current status and future outlook", Carbon Energy, [Online], vol. 2, No. 1,Jan. 10, 2020, pp. 6-43 XP055876308.
Woslinker: "Solubility table—Wikipedia", Wikipedia, Dec. 31, 2021, pp. 1-21, Retrieved from the Internet: URL: https://en.wikipedia.org/w/index.php?title=Solubility table&oldid=1063020275 XP093370149.
Kumar Arkadeep et al., "Opportunities and challenges of electrochemical water treatment integrated with renewable energy at the water-energy nexus", vol. 3, Apr. 21, 2020, pp. 110-116 XP093370152.
English translation of the PCT/ISA/210 of PCT/JP2022/036663.
Notice of Reasons for Revocation from priority application JP 2021-198433 with the English translation thereof.
Second Notice of Reasons for Revocation from priority application JP 2021-198433 with the English translation thereof.
Written Opposition dispatched 0221109.
Notice of Dispatch of Duplicates of a Written Written Opposition from priority application JP 2021-198433 with the English translation thereof.
English translation of the PCT/ISA/210 of PCT/JP2023/014342 with the English translation thereof.
English translation of the PCT/ISA/210 of PCT/JP2023/019813 with the English translation thereof.
The Extended European Search Report dated Dec. 1, 2025 issued in the corresponding EP Patent Application No. 22876530.1.
Soumaya Gmar et al., "Recent advances on electrodialysis for the recovery of lithium from primary and secondary resources", Hdrometallurgy 189 (2019)105124, pp. 1-12.
Office Action dated Mar. 19, 2026 issued in corresponding Chinese patent application No. 202280059655.9 along with its mechanical translation.
Office Action dated Apr. 7, 2026 issued in corresponding Japanese patent application No. 2022-086680 along with its English mechanical translation.
Office Action dated Jan. 29, 2026 issued in the corresponding Korean Patent Application No. 10-2024-7031297 with the English translation thereof.
Submission of Information dated Mar. 26, 2024 submitted to the JPO by a third party in Application No. 2022-064733 The referenced application is not the priority application of the present application (U.S. Appl. No. 18/688,440) but is a divisional application of Japanese patent application No. 2021-198433, which is a corresponding Japanese application of the present application.

(56) References Cited

OTHER PUBLICATIONS

Submission of Information dated Mar. 26, 2024 submitted to the JPO by a third party in Application No. 2022-064732. The referenced application is not the priority application of the present application (U.S. Appl. No. 18/688,440) but is a divisional application of Japanese patent application No. 2021-198433, which is a corresponding Japanese application of the present application.
Submission of Information dated Mar. 26, 2024 submitted to the JPO by a third party in Application No. 2022-064731. The referenced application is not the priority application of the present application (U.S. Appl. No. 18/688,440) but is a divisional application of Japanese patent application No. 2021-198433, which is a corresponding Japanese application of the present application.
Submission of Information dated Mar. 26, 2024 submitted to the JPO by a third party in Application No. 2022-064726. The referenced application is not the priority application of the present application (U.S. Appl. No. 18/688,440) but is a divisional application of Japanese patent application No. 2021-198433, which is a corresponding Japanese application of the present application.
Office Action dated Jan. 19, 2026 issued in the corresponding Korean Patent Application No. 10-2024-7031297 with the English translation thereof.
Office Action dated Dec. 24, 2024 issued in Japanese Patent Application No. 2022-086692, a divisional application of Japanese Patent Application No. 2022-004526, which corresponds to U.S. Appl. No. 18/849,290, with an English machine translation thereof.
Supplementary European Search Report dated Aug. 18, 2025 issued in the corresponding EP Patent Application No. 23784817.1.
Jung et al., "A Novel Closed Loop Process for Recycling Spent Li-ION Battery Cathode Materials", International Journal of Green Energy, 18:15, pp. 1597-1612.
Botelho Junior et al., "Cobalt Recovery from Li-Ion Battery Recycling: A Critical Review", Metals 2021, 11, 1999, pp. 1-25.
Lei et al., "Solvent extraction for recycling of spent lithium-ion batteries", Journal of Hazardous Materials, 424 (2022) 127654.
Office Action dated Oct. 20, 2025 issued in the corresponding Korean Patent Application No. 10-2024-7008226 with the English machine translation thereof.
The extended European search report dated Jul. 23, 2026 issued in the corresponding EP Patent Application No. 23811917.6.
G. Alvial-Hein et al., "Separation and recovery of cobalt and nickel from end of life products via solvent extraction technique: A review", Journal of Cleaner Production 297 (2021) 126592.
A. Chagnes et al., "A brief review on hydrometallurgical technologies for recycling spent lithium-ion batteries", J Chem Technol Biotechnol 2013;88: 1191-1199.
Jinqiu Xu et al., "A review of processes and technologies for the recycling of lithium-ion secondary batteries", Journal of Power Sources 177 (2008) 512-527.
P. Meshram et al., "Extraction of lithium from primary and secondary sources by pre-treatment, leaching and separation: A comprehensive review", Hydrometallurgy 150 (2014) 192-208.
E. Asadi Dalini et al., "A Review on Environmental, Economic and Hydrometallurgical Processes of Recycling Spent Lithium-ion Batteries", Mineral Processing and Extractive Metallurgy Review, An International Journal, Journal homepage: https://www.tandfonline.com/loi/gmpr20.
Kishore K. Jena et al., Comprehensive Review on Concept and Recycling Evolution of Lithium-Ion Batteries (LIBs), ACS Publications, Energy Fuels 2021, 35, 18257-18284.
Marcelo B. Mansur et al., "An Overview on the Recovery of Cobalt from End-of-life Lithium Ion Batteries", Mineral Processing and Extractive Metallurgy Review https://doi.org/10.1080/08827508.2021.1883014.

METHOD FOR RECOVERING LITHIUM FROM WASTE LITHIUM-ION BATTERIES

TECHNICAL FIELD

The present invention relates to a method for recovering lithium from waste lithium-ion batteries, in which metals contained in active material powder obtained by pre-processing waste lithium-ion batteries are separated by a wet process to recover lithium.

BACKGROUND ART

In recent years, along with the widespread use of lithium-ion batteries, methods for recovering valuable metals such as cobalt, nickel, manganese, and lithium from waste lithium-ion batteries and reusing them as materials for the lithium-ion batteries have been investigated.

Conventionally, when recovering the valuable metals from the waste lithium-ion batteries, it has been carried out to separate and refine cobalt, nickel, manganese, and lithium by a wet process from the powder containing the valuable metals (hereinafter, referred to as active material powder) obtained by, for example, crushing and classifying the waste lithium-ion batteries with or without heating treatment (roasting) (for example, see Patent Literatures 1 and 2).

Note that, in the present application, waste lithium-ion batteries mean used lithium-ion batteries that have reached the end of their useful life as battery products, lithium-ion batteries discarded as defective products and the like in the production process, and residual positive electrode and negative electrode materials and the like used for productization in the production process.

CITATION LIST

Patent Literature

Patent Literature 1: Japanese Patent No. 6835820
Patent Literature 2: Japanese Patent No. 6869444

SUMMARY OF INVENTION

Technical Problem

However, in the conventional wet process, a compound other than the lithium compound, which is the recovery target, is used as the alkali source, which increases the concentration of cations other than lithium and simultaneously decreases the concentration of lithium ions. As a result, the conventional wet process has inconveniences that the recovery rate of lithium, the target, is significantly decreased, and that the compound other than the lithium compound used as the alkali source is drained as a salt, making resource circulation impossible.

An object of the present invention is to provide a recovery system for valuable metals from waste lithium-ion batteries that can eliminate such inconveniences to recover lithium at a high recovery rate, enables resource circulation, does not require much energy when recovering lithium from a lithium salt aqueous solution of low concentration, and can simplify the entire process.

Solution to Problem

In order to achieve such an object, a method for recovering lithium from waste lithium-ion batteries of the present invention is characterized in that the method comprises: a dissolution step of dissolving active material powder obtained by pre-processing waste lithium-ion batteries in a mineral acid to obtain an acid solution of the active material containing at least lithium; an alkali metal hydroxide addition step of adding an alkali metal hydroxide to the acid solution obtained in the dissolution step; an extraction step of separating at least one metal excluding alkali metals, out of metals contained in the active material powder, from the acid solution obtained in the alkali metal hydroxide addition step by solvent extraction to obtain a first alkali metal salt aqueous solution; and a first electrolysis step of electrolyzing the first alkali metal salt aqueous solution using an ion exchange membrane to obtain an alkali metal hydroxide aqueous solution, an acid, and a second alkali metal salt aqueous solution that is more dilute than the first alkali metal salt aqueous solution, that the alkali metal hydroxide aqueous solution obtained in the first electrolysis step is reused in at least one selected from the group consisting of the alkali metal hydroxide addition step and the extraction step, and that at least one selected from the group consisting of a mineral acid obtained by recovering gas produced in the first electrolysis step and a mineral acid obtained in an anode chamber of the first electrolysis step is reused in the dissolution step.

In the method for recovering lithium from waste lithium-ion batteries of the present invention, at first, active material powder obtained by pre-processing the waste lithium-ion batteries is dissolved in a mineral acid to obtain an acid solution of the active material containing at least lithium. The acid solution contains valuable metals that have been contained in the active material powder, and examples of the valuable metals may include metals such as iron, aluminum, manganese, cobalt, and nickel, in addition to lithium.

Next, in the method for recovering lithium from waste lithium-ion batteries of the present invention, an alkali metal hydroxide is added to the acid solution. As a result, the pH of the acid solution can be adjusted (neutralized).

Next, in the method for recovering lithium from waste lithium-ion batteries of the present invention, at least one metal excluding lithium, out of the metals contained in the active material powder, is separated by solvent extraction from the acid solution to which the alkali metal hydroxide has been added, thereby obtaining a first alkali metal salt aqueous solution.

Next, in the method for recovering lithium from waste lithium-ion batteries of the present invention, the first alkali metal salt aqueous solution is subjected to a first electrolysis step using an ion exchange membrane. By doing so, an alkali metal hydroxide aqueous solution, an acid, and a second alkali metal salt aqueous solution that is more dilute than the first alkali metal salt aqueous solution can be obtained.

Then, in the method for recovering lithium from waste lithium-ion batteries of the present invention, a portion of the alkali metal hydroxide aqueous solution is reused in at least one selected from the group consisting of the alkali metal hydroxide addition step and the extraction step. Furthermore, the acid is used as the mineral acid.

As described above, according to the method for recovering lithium from waste lithium-ion batteries of the present invention, the alkali metal hydroxide is used as the alkali source, which improves the recovery rate of lithium, and no alkali source compound other than the lithium compound is drained. In addition, according to the method for recovering lithium from waste lithium-ion batteries of the present invention, by returning to the steps prior to the first electrolysis step the alkali metal hydroxide and the mineral acid obtained by subjecting to the first electrolysis step the first alkali metal salt aqueous solution obtained by solvent extraction of the acid solution, resource circulation can be carried out.

In addition, in the method for recovering lithium from waste lithium-ion batteries of the present invention, it is preferable that the second alkali metal salt aqueous solution is concentrated and added to the first alkali metal salt aqueous solution. By doing so, the second alkali metal salt aqueous solution is recovered without being drained, which can further improve the recovery rate of lithium and enable resource circulation.

In addition, in the method for recovering lithium from waste lithium-ion batteries of the present invention, the mineral acid includes, for example, at least one acid selected from the group consisting of hydrochloric acid, sulfuric acid, and nitric acid, but preferably includes hydrochloric acid. In the method for recovering lithium from waste lithium-ion batteries of the present invention, in the case where hydrochloric acid is used as the mineral acid, when subjecting the first alkali metal salt aqueous solution to the first electrolysis step using an ion exchange membrane, chlorine gas and hydrogen gas can be obtained. Then, it is preferable to produce hydrochloric acid by allowing the chlorine gas and the hydrogen gas to react with each other, and to use the produced hydrochloric acid as the mineral acid.

In addition, in the method for recovering lithium from waste lithium-ion batteries of the present invention, it is preferable that electric power used for the first electrolysis step includes electric power obtained by renewable energy, and examples of the electric power obtained by renewable energy may include electric power obtained by solar power generation and electric power obtained by wind power generation.

DESCRIPTION OF EMBODIMENTS

Next, with reference to the accompanying drawings, embodiments of the present invention will be described in further detail.

Figure 1:
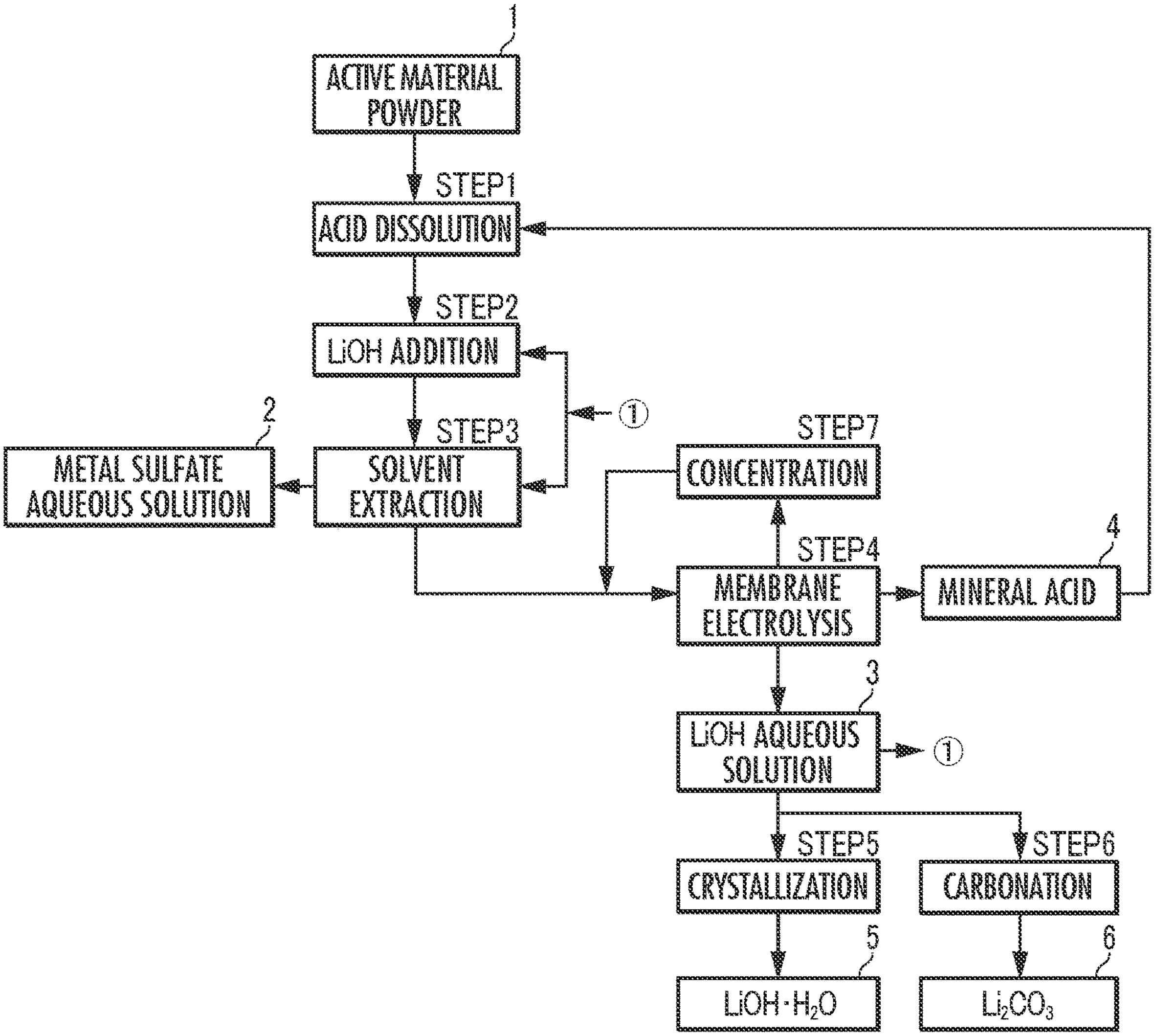
FIG. 1 is an explanatory drawing showing the configuration of the method for recovering lithium from waste lithium-ion batteries of the first embodiment.

As shown in FIG. 1, in the method for recovering valuable metals from waste lithium-ion batteries of the first embodiment of the present invention (hereinafter, abbreviated as "recovery method"), active material powder 1 is used as the starting material.

In the case where the waste lithium-ion batteries are used lithium-ion batteries that have reached the end of their useful life as battery products or lithium-ion batteries discarded as defective products and the like in the production process, they are first subjected to discharge treatment in salt water to discharge all remaining electric charges. Subsequently, after forming an opening in the housing of the waste lithium-ion batteries, for example, they are either subjected to heating treatment (roasting) at a temperature in the range of 100 to 800° C. or not subjected to heating treatment, and then crushed with a crusher such as a hammer mill or jaw crusher, and the housing, current collectors, and other components constituting the waste lithium-ion batteries are removed (classified) by sieving, thereby obtaining the active material powder 1. Alternatively, the active material powder 1 may be obtained by crushing the waste lithium-ion batteries after the discharge treatment with the crusher, removing the housing, current collectors, and other components by sieving, and then performing heating treatment at a temperature in the range described above.

In addition, in the case where the waste lithium-ion batteries are residual positive electrode materials and the like used for productization in the production process, without performing the discharge treatment and formation of the opening, the active material powder 1 may be obtained by either performing heating treatment at a temperature in the range described above or not performing heating treatment, then crushing them with the crusher, and removing current collectors and other components by sieving, or by crushing them with the crusher, removing current collectors and other components by sieving, and then performing heating treatment at a temperature in the range described above.

In the recovery method of the first embodiment, next, the active material powder 1 is dissolved in a mineral acid in STEP 1 to obtain an acid solution of the active material powder 1 containing at least lithium. The mineral acid includes, for example, one acid selected from the group consisting of hydrochloric acid, sulfuric acid, and nitric acid, but preferably includes hydrochloric acid. The active material powder 1 contains valuable metals such as iron, aluminum, manganese, cobalt, and nickel, in addition to lithium.

For the acid solution, next, lithium hydroxide (LiOH) is added in STEP 2, thereby neutralizing the mineral acid. The acid solution after the neutralization is next subjected to solvent extraction in STEP 3. In the solvent extraction, manganese, cobalt, and nickel, excluding lithium, out of the valuable metals, are separately solvent extracted, or iron and aluminum are separated and removed as their respective metal sulfate aqueous solutions 2, thereby obtaining a first lithium salt aqueous solution. In the case where hydrochloric acid is used for the acid dissolution in STEP 1, the lithium salt contained in the first lithium salt aqueous solution is lithium chloride.

In the recovery method of the first embodiment, next, the first lithium salt aqueous solution is subjected to a first electrolysis step using an ion exchange membrane in STEP 4. In the first embodiment, the electrolysis in the first electrolysis step using the ion exchange membrane is referred to as membrane electrolysis. The membrane electrolysis in STEP 4 can be carried out using, for example, an electrolytic bath 11 shown in FIG. 2.

The electrolytic bath 11 comprises an anode plate 12 on one inner side and a cathode plate 13 on the inner side opposite to the anode plate 12, and the anode plate 12 is connected to an anode 14 of the power source and the cathode plate 13 is connected to a cathode 15 of the power source. In addition, the electrolytic bath 11 is compartmentalized by an ion exchange membrane 16 into an anode chamber 17 comprising the anode plate 12 and a cathode chamber 18 comprising the cathode plate 13.

In the electrolytic bath 11, when lithium chloride, for example, is supplied as the first lithium salt aqueous solution to the anode chamber 17 to carry out electrolysis in the first electrolysis step, chloride ions produce chlorine gas ($Cl_2$) on the anode plate 12, while lithium ions move through the ion exchange membrane 16 to the cathode chamber 18.

In the cathode chamber 18, water ($H_2O$) is ionized into hydroxide ions ($OH^-$) and hydrogen ions ($H^+$), and hydrogen ions produce hydrogen gas ($H_2$) on the cathode plate 13, while hydroxide ions are combined with lithium to produce a lithium hydroxide aqueous solution 3.

As the electric power required for the membrane electrolysis in the first electrolysis step, for example, electric power obtained by renewable energy, such as electric power obtained by solar power generation and electric power obtained by wind power generation, can be used.

In the present embodiment, by allowing the hydrogen gas ($H_2$) and chlorine gas ($Cl_2$) produced by the membrane electrolysis in the first electrolysis step to react with each other, hydrochloric acid as a mineral acid 4 can be obtained, and the mineral acid 4 can be used for dissolution of the active material powder 1 in STEP 1.

The lithium hydroxide aqueous solution 3 obtained by the membrane electrolysis in the first electrolysis step can be recovered as lithium hydroxide monohydrate ($LiOH \cdot H_2O$) by crystallization in STEP 5, or can be recovered as lithium carbonate ($Li_2CO_3$) by carbonation in STEP 6. The carbonation can be carried out by allowing the lithium hydroxide aqueous solution 3 to react with carbon dioxide gas ($CO_2$).

In addition, in the first embodiment, a portion of the lithium hydroxide aqueous solution 3 obtained by the membrane electrolysis in the first electrolysis step can be used for at least one application selected from the group consisting of the use as lithium hydroxide to be added to the acid solution in STEP 2 and the use for the solvent extraction in STEP 3.

In the case where the lithium hydroxide aqueous solution 3 is used for the solvent extraction in STEP 3, the lithium hydroxide aqueous solution 3 is added to an extraction solvent. Since the extraction solvent used for the solvent extraction in STEP 3 is a cation exchange extractant, if it is used continuously, the liquid nature will lean toward the acidic side and the extraction rate will be decreased, but addition of the lithium hydroxide aqueous solution 3 can suppress the decrease in the extraction rate.

In addition, in the case where the lithium hydroxide aqueous solution 3 is used for the solvent extraction in STEP 3, the lithium hydroxide aqueous solution 3 can be used for the solvent extraction of at least one of manganese, cobalt, and nickel, each of which is separately solvent extracted.

In addition, in the membrane electrolysis in the first electrolysis step, the first lithium salt aqueous solution is electrolyzed, resulting in production of a second lithium salt aqueous solution that is more dilute than the first lithium salt aqueous solution. Then, in the first embodiment, the second lithium salt aqueous solution is concentrated in STEP 7 and added to the first lithium salt aqueous solution. The concentration in STEP 7 can be carried out using, for example, a reverse osmosis membrane (RO membrane).

According to the recovery method of the first embodiment, a lithium salt aqueous solution of high concentration can be obtained since no alkali source other than lithium is supplied. In addition, since lithium hydroxide can be obtained by electrolyzing the lithium salt aqueous solution of high concentration in the first electrolysis step, the recovery rate of lithium can be improved. Furthermore, according to the recovery method of the first embodiment, since there is no unnecessary alkali source but lithium, lithium hydroxide obtained by the electrolysis in the first electrolysis step can be returned to the steps as it is, thus enabling resource circulation.

Figure 3:
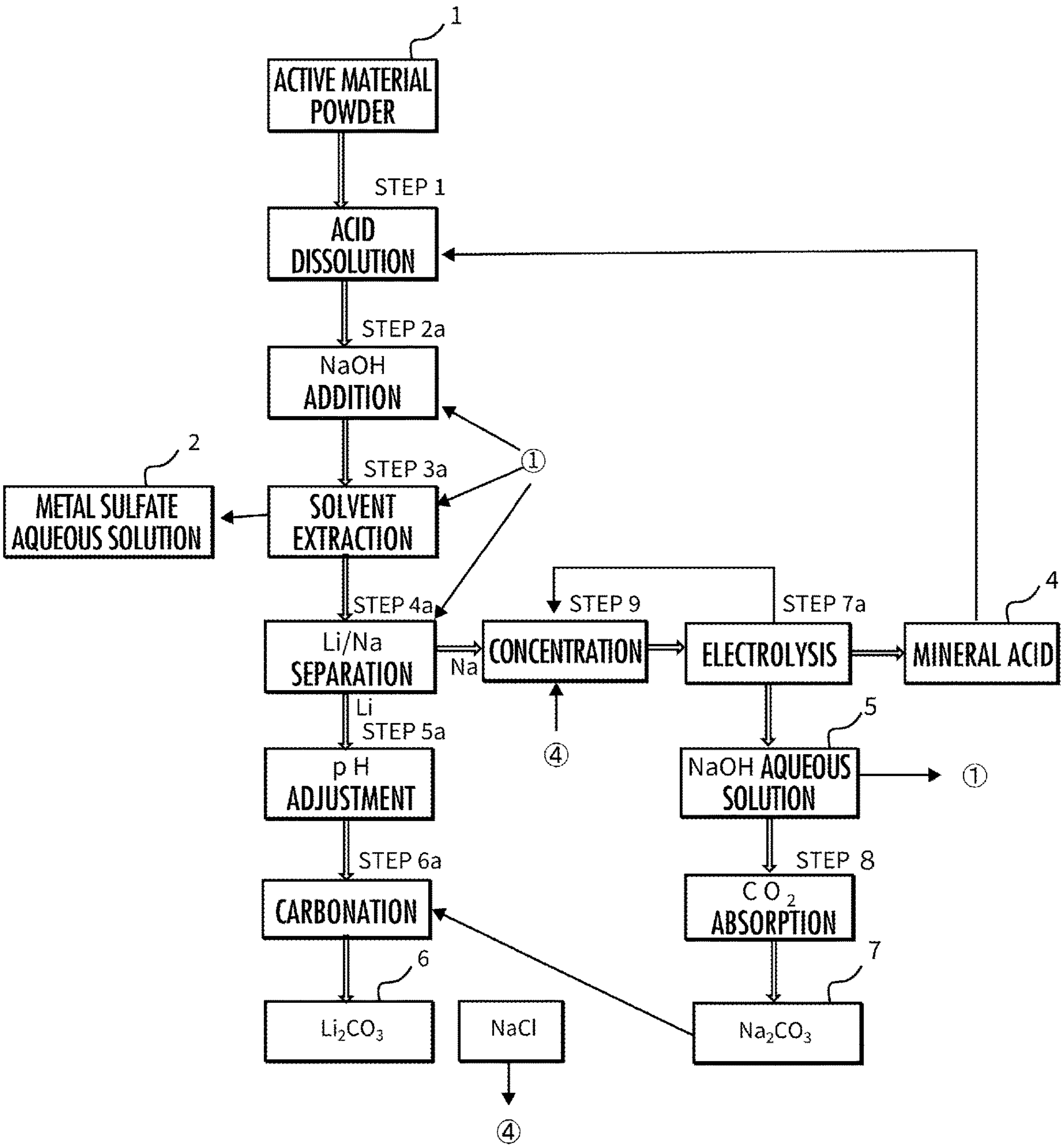
FIG. 3 is an explanatory drawing showing the configuration of the method for recovering lithium from waste lithium-ion batteries of the second embodiment.

The recovery method of the second embodiment comprises an alkali metal hydroxide addition step (STEP 2*a*) in which at least one selected from the group consisting of sodium hydroxide and potassium hydroxide is added to the solution of the valuable metals obtained in the dissolution step (STEP 1). In FIG. 3, the case where only sodium hydroxide is added as the alkali metal hydroxide is shown. The addition of at least one selected from the group consisting of sodium hydroxide and potassium hydroxide may be at least one of the following: addition of at least one solid selected from the group consisting of sodium hydroxide and potassium hydroxide, addition of at least one selected from the group consisting of a sodium hydroxide aqueous solution and a potassium hydroxide aqueous solution, and a mixed form thereof. The solution of the valuable metals is neutralized in the alkali metal hydroxide addition step.

Furthermore, there is a case where iron hydroxide and aluminum hydroxide are sequentially precipitated by the addition of at least one of sodium hydroxide and potassium hydroxide to the solution of the valuable metals, resulting in separation of iron and aluminum from the solution of the valuable metals.

The recovery method of the second embodiment comprises an extraction step (STEP 3*a*) in which at least one of iron, aluminum, manganese, cobalt, and nickel contained in the active material powder 1 is extracted by solvent extraction with an organic solvent from the solution obtained in the alkali metal hydroxide addition step.

Lithium, sodium, manganese, cobalt, and nickel are contained in the solution of the valuable metals that has been neutralized in the alkali metal hydroxide addition step. In the case where iron and aluminum have not been removed in the alkali metal hydroxide addition step, iron and aluminum are also contained in the solution of the valuable metals.

The extraction step includes a first extraction step in which iron, aluminum, manganese, cobalt, or nickel is extracted with a first organic solvent from the solution of the valuable metals. The pH of a homogeneous mixed solution of the solution of the valuable metals and the first organic solvent is adjusted by addition of an alkali, such as at least one of sodium hydroxide and potassium hydroxide, and a first metal-containing organic phase and a first extraction residual liquid are obtained in the first extraction step.

The extraction step may include a second extraction step in which valuable metals that have not been extracted in the first extraction step are extracted with a second organic solvent from the first extraction residual liquid. The pH of a homogeneous mixed solution of the first extraction residual liquid and the second organic solvent is adjusted by addition of an alkali, such as at least one of sodium hydroxide and potassium hydroxide, and a second metal-containing organic phase and a second extraction residual liquid are obtained in the second extraction step.

The extraction step may include third to fifth extraction steps in which valuable metals that have not been extracted in the first and second extraction steps are sequentially extracted from the second extraction residual liquid.

Examples of the organic solvent used in the extraction step include bis(2-ethylhexyl) hydrogen phosphate, 2-ethylhexyl (2-ethylhexyl)phosphonate, and bis(2,4,4-trimethylpentyl)phosphinic acid. The organic solvent may be diluted with a hydrocarbon, such as kerosene.

Back extraction with sulfuric acid is performed on each of the iron-containing organic phase, aluminum-containing organic phase, manganese-containing organic phase, cobalt-containing organic phase, and nickel-containing organic phase to recover the metal sulfate (iron sulfate, aluminum sulfate, manganese sulfate, cobalt sulfate, and nickel sulfate) aqueous solutions 2.

The recovery method of the second embodiment comprises a separation step (STEP 4*a*) in which each of a lithium salt and a salt of at least one of sodium and potassium is separated from an alkali metal mixed salt aqueous solution containing lithium and at least one of sodium and potassium as a residual liquid of the solvent extraction, obtained in the extraction step.

The separation step is not limited to a specific method, and is preferably carried out by at least one selected from the group consisting of the lithium phosphate method, the evaporative concentration method, and the solvent extraction method.

<Lithium Phosphate Method in Second Embodiment>

Figure 4:
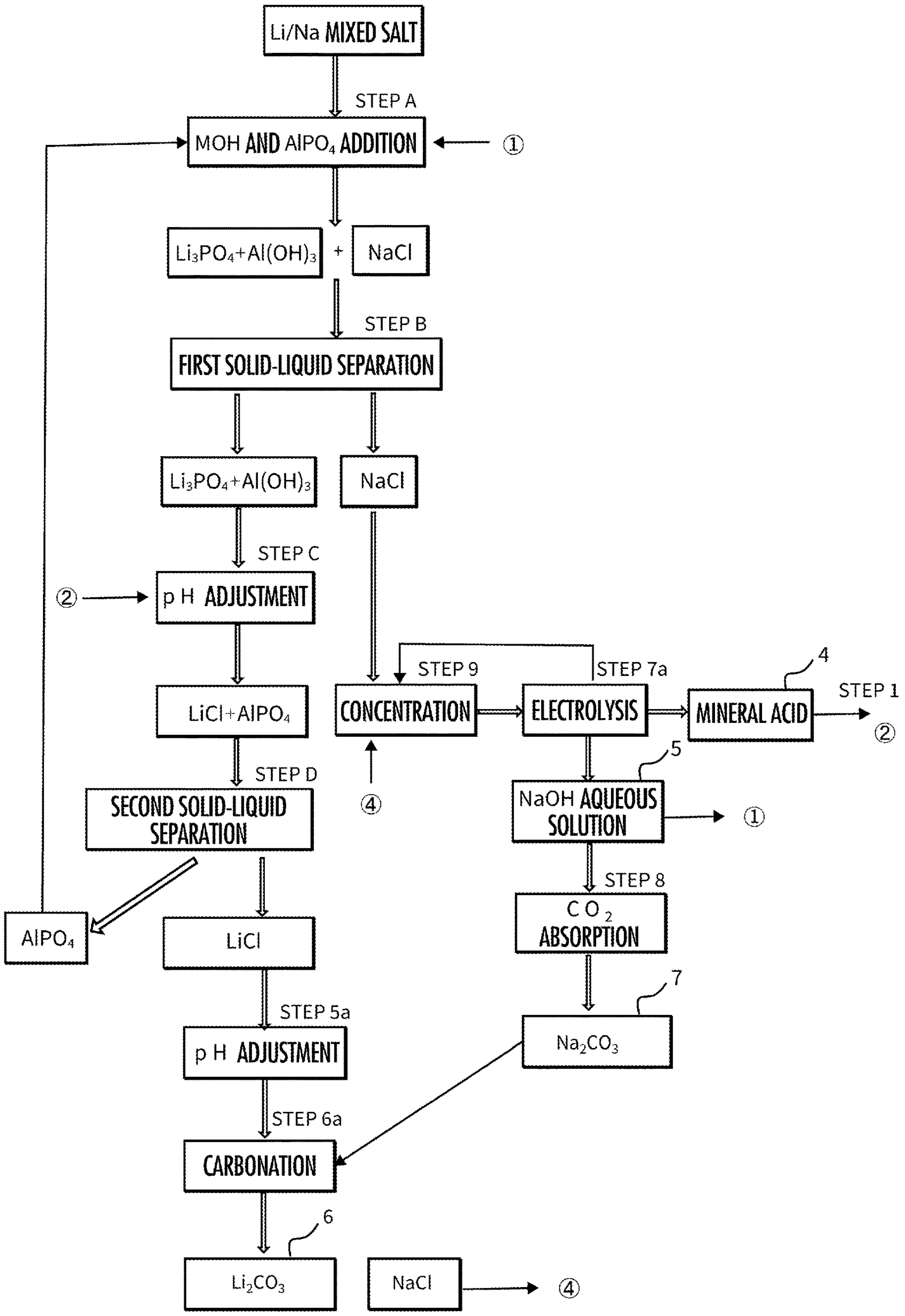
FIG. 4 is an explanatory drawing showing the lithium phosphate method in the second embodiment.

FIG. 4 is used to describe the lithium phosphate method. The lithium phosphate method includes a phosphorylation step (STEP A) in which aluminum phosphate and an alkali metal hydroxide (MOH) aqueous solution of at least one of sodium hydroxide and potassium hydroxide are added to the alkali metal mixed salt aqueous solution to produce a solid product containing lithium phosphate and aluminum hydroxide. An alkali metal chloride (MCl) is dissolved in the aqueous liquid in which the solid product has been produced. The alkali metal hydroxide is preferably sodium hydroxide. In FIG. 4, the case where only sodium hydroxide is used as the alkali metal hydroxide is shown.

The lithium phosphate method includes a first solid-liquid separation (STEP B) in which the solid product that has been produced in the phosphorylation step is solid-liquid separated. Examples of the first solid-liquid separation step include filtration.

In the lithium phosphate method, the solid product that has been separated in the first solid-liquid separation step may be washed. The method includes a pH adjustment step (STEP C) in which a mineral acid is added to a suspension obtained by suspending the solid product in water to adjust the pH of the suspension to 2 to 3. The mineral acid is not limited to a specific mineral acid. The mineral acid includes at least one selected from the group consisting of hydrochloric acid, sulfuric acid, and nitric acid. The mineral acid is preferably at least one selected from the group consisting of hydrochloric acid, sulfuric acid, and nitric acid, more preferably hydrochloric acid, sulfuric acid, or nitric acid, and still more preferably hydrochloric acid. In the case where the mineral acid is hydrochloric acid, the lithium salt is lithium chloride, and this case is described in FIG. 4.

The lithium phosphate method includes a second solid-liquid separation step (STEP D) in which the aluminum phosphate and lithium salt aqueous solution obtained in the pH adjustment step is solid-liquid separated. Examples of the second solid-liquid separation step include filtration. Aluminum phosphate obtained in the second solid-liquid separation step can be solid-liquid separated in a short time, and aluminum phosphate that has been solid-liquid separated is reused in the phosphorylation step.

The pH of the lithium salt aqueous solution obtained in the second solid-liquid separation step is preferably adjusted in a pH adjustment step (STEP 5*a*), which will be described later. Since the pH of the suspension has been adjusted to 2 to 3 in the pH adjustment step (STEP C), the pH of the lithium salt aqueous solution is 2 to 3, but the pH is preferably adjusted to 6 to 8 in the pH adjustment step (STEP 5*a*). In this case, unreacted aluminum and phosphorus are precipitated, and the purity of the lithium salt aqueous solution becomes higher.

Preferably, a carbonation step (STEP 6*a*), which will be described later, is performed in which the lithium salt aqueous solution having pH adjusted in the pH adjustment step (STEP 5*a*) is carbonated to obtain lithium carbonate. In an aqueous solution of a salt of at least one of sodium and potassium produced in the carbonation step, at least one selected from the group consisting of sodium chloride and potassium chloride, a minute amount of lithium chloride, and at least one selected from the group consisting of sodium carbonate and potassium carbonate are dissolved, and the pH of the aqueous solution of a salt of at least one selected from the group consisting of sodium and potassium is preferably around 12. When hydrochloric acid is added to the aqueous solution of a salt of at least one selected from the group consisting of sodium and potassium to adjust its pH to 5 or less, at least one selected from the group consisting of sodium carbonate and potassium carbonate is decomposed to produce carbon dioxide and water, and the aqueous solution becomes one in which at least one selected from the group consisting of sodium chloride and potassium chloride is dissolved. The aqueous solution may be concentrated in a concentration step (STEP 9), which will be described later. FIG. 4 describes the case where the concentration step is performed.

In the lithium phosphate method, the filtrate in which the alkali metal chloride is dissolved, separated in the first solid-liquid separation step, may be concentrated in the concentration step (STEP 9), which will be described later.

<Evaporative Concentration Method in Second Embodiment>

The alkali metal mixed salt aqueous solution of lithium and at least one selected from the group consisting of sodium and potassium is evaporatively concentrated, and at least one selected from the group consisting of a sodium salt and a potassium salt, such as at least one selected from the group consisting of sodium chloride and potassium chloride, is sequentially crystallized and separated from the alkali metal mixed salt aqueous solution. The at least one selected from the group consisting of a sodium salt and a potassium salt, such as at least one selected from the group consisting of sodium chloride and potassium chloride, that has been separated is dissolved in water, and a first electrolysis step (STEP 7*a*), which will be described later, is performed in which the aqueous solution of a salt of at least one selected from the group consisting of sodium and potassium is electrolyzed using an ion exchange membrane. The lithium salt aqueous solution from which at least one selected from the group consisting of a sodium salt and a potassium salt has been separated is preferably subjected to a pH adjustment step (STEP 5*a*) and further to a carbonation step (STEP 6*a*), both of which will be described later, in the same manner as for the lithium salt aqueous solution obtained by the lithium phosphate method. In the case where the aqueous solution of a salt of at least one selected from the group consisting of sodium and potassium produced in the carbonation step is an aqueous solution in which at least one selected from the group consisting of sodium chloride and potassium chloride is dissolved as described above, the aqueous solution may be concentrated in a concentration step (STEP 9), which will be described later.

<Solvent Extraction Method in Second Embodiment>

The pH of a homogeneous mixed solution of the mixed salt aqueous solution of lithium and at least one selected from the group consisting of sodium and potassium and an organic solvent for lithium extraction is preferably adjusted to the range of 5 to 9 by addition of an alkali, such as at least one selected from the group consisting of sodium hydroxide and potassium hydroxide, and a lithium-containing organic phase and an aqueous solution of a salt of at least one selected from the group consisting of sodium and potassium as an extraction residual liquid are obtained. Examples of the organic solvent for lithium extraction include bis(2-ethylhexyl) hydrogen phosphate. Scrubbing with a mineral acid is performed on the lithium-containing organic phase, and a lithium salt aqueous solution is recovered. The lithium salt aqueous solution is preferably subjected to a pH adjustment step (STEP 5*a*) and further to a carbonation step (STEP 6*a*), both of which will be described later, in the same manner as for the lithium salt aqueous solution obtained by the lithium phosphate method. In the case where the aqueous solution of a salt of at least one selected from the group consisting of sodium and potassium produced in the carbonation step is an aqueous solution in which at least one selected from the group consisting of sodium chloride and potassium chloride is dissolved as described above, the aqueous solution may be concentrated in a concentration step (STEP 9), which will be described later.

A first electrolysis step (STEP 7*a*), which will be described later, is performed in which the aqueous solution of a salt of at least one selected from the group consisting of sodium and potassium, in which at least one selected from the group consisting of a sodium salt and a potassium salt, such as at least one selected from the group consisting of sodium chloride and potassium chloride, is dissolved, from which lithium has been separated by extraction, is electrolyzed using an ion exchange membrane. The aqueous solution of a salt of at least one selected from the group consisting of sodium and potassium is preferably concentrated using a reverse osmosis membrane (RO membrane) or the like in a concentration step (STEP 9), which will be described later.

The recovery method of the second embodiment may comprise a pH adjustment step (STEP 5*a*) in which at least one selected from the group consisting of sodium hydroxide and potassium hydroxide is added to the lithium salt aqueous solution obtained in the separation step to adjust the pH of the lithium salt aqueous solution. The pH of the lithium salt aqueous solution is preferably adjusted to 8 to 14, and more preferably to 10 to 11.

The recovery method of the second embodiment comprises a carbonation step (STEP 6*a*) in which the lithium salt aqueous solution obtained in the separation step is carbonated to obtain lithium carbonate. In the carbonation step, an alkali metal carbonate (excluding lithium carbonate), such as at least one selected from the group consisting of sodium carbonate and potassium carbonate, obtained in a carbon dioxide absorption step (STEP 8) in which carbon dioxide is absorbed into an aqueous solution 5 in which at least one selected from the group consisting of sodium hydroxide and potassium hydroxide is dissolved, obtained in a first electrolysis step (STEP 7*a*), which will be described later, may be added to the lithium salt aqueous solution.

The alkali metal of the alkali metal carbonate is at least one selected from the group consisting of sodium, potassium, rubidium, cesium, and francium. The alkali metal is preferably at least one selected from the group consisting of sodium and potassium, and more preferably sodium.

Figure 5:
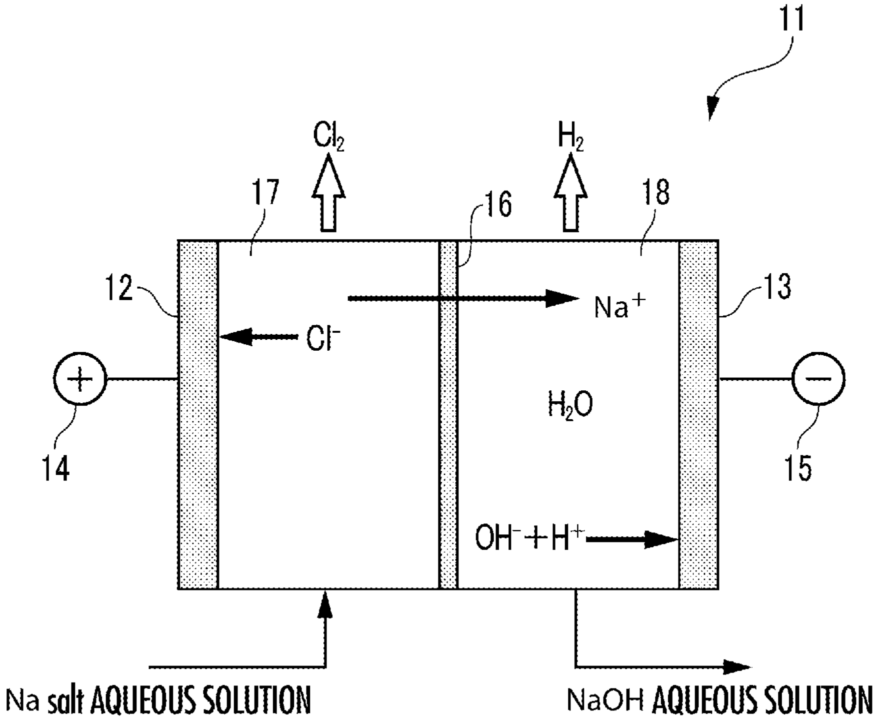
FIG. 5 is an explanatory cross-sectional view showing the structure of the ion exchange membrane electrolytic bath used in the method for recovering lithium from waste lithium-ion batteries of the second and third embodiments.

The recovery method of the second embodiment comprises a first electrolysis step (STEP 7*a*) in which the aqueous solution of a salt of at least one selected from the group consisting of sodium and potassium in which, for example, at least one selected from the group consisting of sodium chloride and potassium chloride is dissolved, obtained in the separation step, is electrolyzed using an ion exchange membrane to obtain an alkali metal hydroxide aqueous solution. The first electrolysis step can be carried out using, for example, an electrolytic bath 11 shown in FIG. 5.

The electrolytic bath 11 comprises an anode plate 12 on one inner side and a cathode plate 13 on the inner side opposite to the anode plate 12, and the anode plate 12 is connected to an anode 14 of the power source and the cathode plate 13 is connected to a cathode 15 of the power source. In addition, the electrolytic bath 11 is compartmentalized by an ion exchange membrane 16 into an anode chamber 17 comprising the anode plate 12 and a cathode chamber 18 comprising the cathode plate 13.

In the electrolytic bath 11, when the aqueous solution of a salt of at least one selected from the group consisting of sodium and potassium is supplied to the anode chamber 17 to carry out electrolysis, chloride ions produce chlorine gas ($Cl_2$) on the anode plate 12. Meanwhile, ions of at least one alkali metal selected from the group consisting of sodium ions and potassium ions move through the ion exchange membrane 16 to the cathode chamber 18.

In the cathode chamber 18, water ($H_2O$) is ionized into hydroxide ions (OH) and hydrogen ions ($H^+$), and hydrogen ions produce hydrogen gas ($H_2$) on the cathode plate 13, while hydroxide ions and at least one selected from the group consisting of sodium ions and potassium ions produce an alkali metal hydroxide aqueous solution 5 in which at least one selected from the group consisting of sodium hydroxide and potassium hydroxide is dissolved.

As the electric power required for the first electrolysis step, for example, renewable energy, preferably at least one selected from the group consisting of solar power generation and wind power generation, is used.

In the case where the aqueous solution of a salt of at least one selected from the group consisting of sodium and potassium contains chloride ions, the hydrogen gas ($H_2$) and chlorine gas ($Cl_2$) produced in the first electrolysis step can be allowed to react with each other to obtain hydrochloric acid. In the case where the aqueous solution of a salt of at least one selected from the group consisting of sodium and potassium contains sulfate ions, sulfuric acid can be obtained in the anode chamber 17. In the case where the aqueous solution of a salt of at least one selected from the group consisting of sodium and potassium contains nitrate ions, nitric acid can be obtained in the anode chamber 17. That is, a mineral acid 4 can be obtained in the first electrolysis step, and the mineral acid 4 is used for at least one selected from the group consisting of dissolution of the active material powder 1 in STEP 1 and pH adjustment in STEP C.

The recovery method of the second embodiment may comprise a carbon dioxide absorption step (STEP 8) in which carbon dioxide is absorbed into the alkali metal hydroxide aqueous solution 5 in which at least one selected from the group consisting of sodium hydroxide and potassium hydroxide is dissolved, obtained in the first electrolysis step. At least one alkali metal carbonate 7 selected from the group consisting of sodium carbonate and potassium carbonate produced in the carbon dioxide absorption step may be used in the carbonation step.

The alkali metal hydroxide aqueous solution 5 produced in the first electrolysis step is reused in at least one step selected from the group consisting of the alkali metal hydroxide addition step, the extraction step, the separation step by the lithium phosphate method, and the separation step by the solvent extraction method.

In the first electrolysis step, the aqueous solution of a salt of at least one selected from the group consisting of sodium and potassium is electrolyzed, resulting in production of an aqueous solution of a salt of at least one selected from the group consisting of sodium and potassium that is more dilute than the aqueous solution of a salt of at least one selected from the group consisting of sodium and potassium. Then, the recovery method of the second embodiment may comprise a concentration step (STEP 9) in which the dilute aqueous solution of a salt of at least one selected from the group consisting of sodium and potassium is concentrated and added to the aqueous solution of a salt of at least one selected from the group consisting of sodium and potassium obtained in the separation step. The concentration step can be carried out using, for example, a reverse osmosis membrane (RO membrane).

The method comprises a separation step (STEP 4*a*) in which each of a lithium salt and a salt of at least one selected from the group consisting of sodium and potassium is separated from the alkali metal mixed salt aqueous solution.

Figure 6:
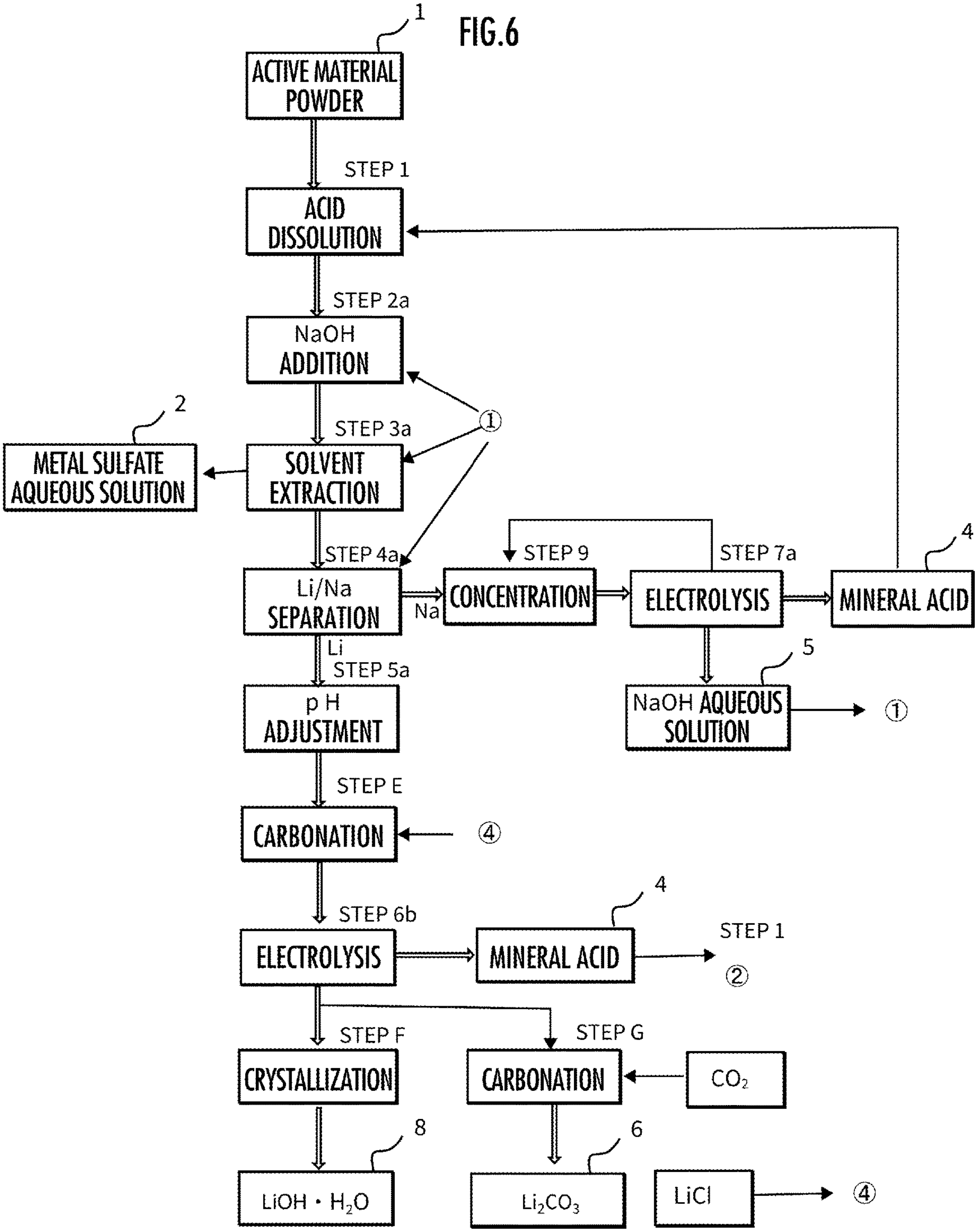
FIG. 6 is an explanatory drawing showing the configuration of the method for recovering lithium from waste lithium-ion batteries of the third embodiment.

FIG. 6 is used to describe the third embodiment. The third embodiment comprises a separation step (STEP 4*a*) in which each of a lithium salt and a salt of at least one selected from the group consisting of sodium and potassium is separated from the alkali metal mixed salt aqueous solution obtained in the same manner as in the second embodiment.

The separation step is not limited to a specific method, and is preferably carried out by at least one selected from the group consisting of the lithium phosphate method, the evaporative concentration method, and the solvent extraction method.

(Lithium Phosphate Method in Third Embodiment)

Figure 7:
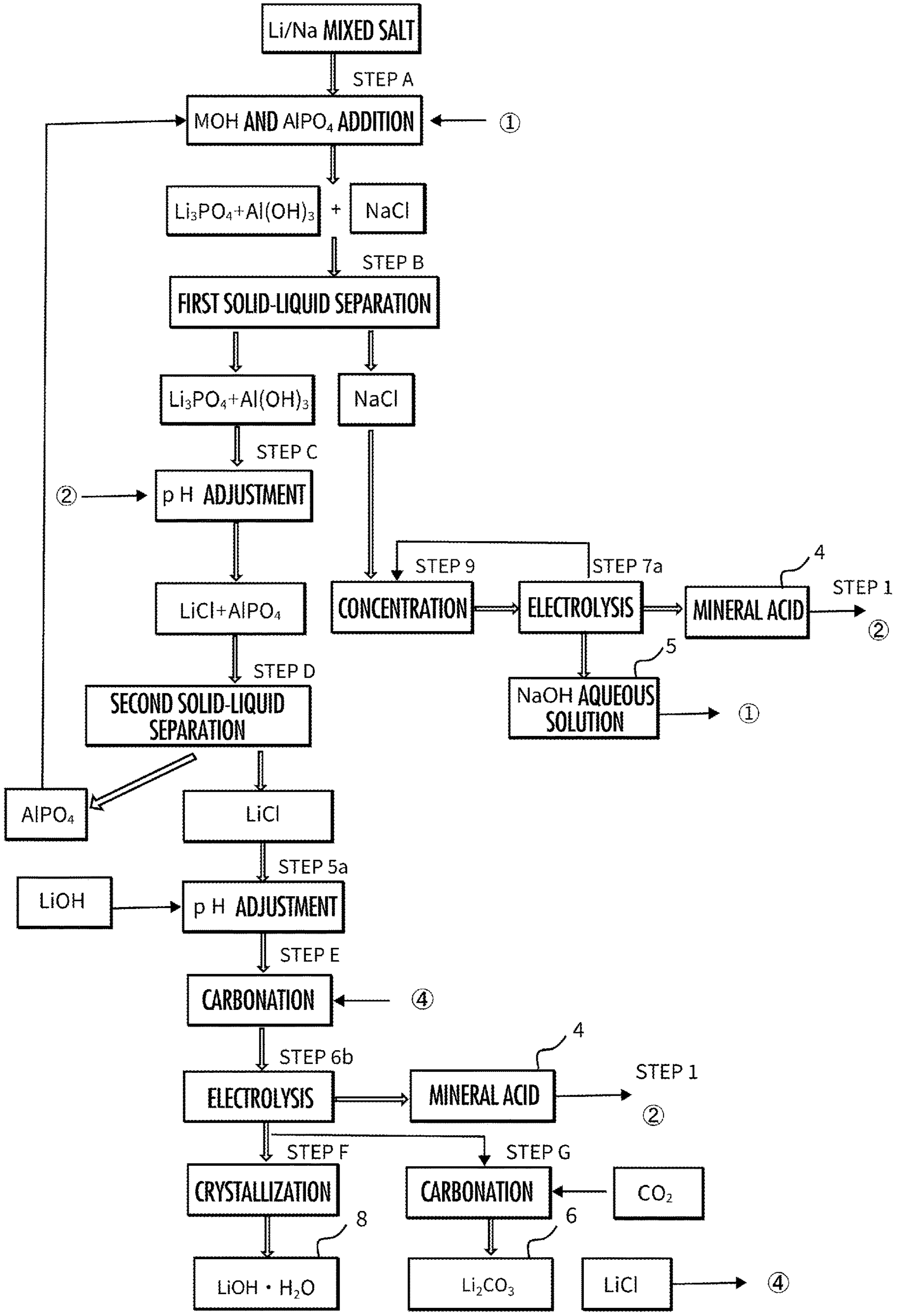
FIG. 7 is an explanatory drawing showing the lithium phosphate method in the third embodiment.

FIG. 7 is used to describe the lithium phosphate method in the third embodiment. The lithium phosphate method includes a phosphorylation step (STEP A) in which aluminum phosphate and an alkali metal hydroxide (MOH) aqueous solution of at least one selected from the group consisting of sodium hydroxide and potassium hydroxide are added to the alkali metal mixed salt aqueous solution to produce a solid product containing lithium phosphate and aluminum hydroxide. An alkali metal chloride (MCl) is dissolved in the aqueous liquid in which the solid product has been produced. The alkali metal hydroxide is preferably sodium hydroxide. In FIG. 7, the case where only sodium hydroxide is used as the alkali metal hydroxide is shown.

The lithium phosphate method includes a first solid-liquid separation (STEP B) in which the solid product that has been produced in the phosphorylation step is solid-liquid separated. Examples of the first solid-liquid separation step include filtration.

In the lithium phosphate method, the solid product that has been separated in the first solid-liquid separation step may be washed. The method includes a pH adjustment step (STEP C) in which a mineral acid is added to a suspension obtained by suspending the solid product in water to adjust the pH of the suspension to 2 to 3. The mineral acid is not limited to a specific mineral acid. The mineral acid includes at least one selected from the group consisting of hydrochloric acid, sulfuric acid, and nitric acid. The mineral acid is preferably at least one selected from the group consisting of hydrochloric acid, sulfuric acid, and nitric acid, more preferably hydrochloric acid, sulfuric acid, or nitric acid, and still more preferably hydrochloric acid. In the case where the mineral acid is hydrochloric acid, the lithium salt is lithium chloride, and this case is described in FIG. 7.

The lithium phosphate method includes a second solid-liquid separation step (STEP D) in which the aluminum phosphate and lithium salt aqueous solution obtained in the pH adjustment step is solid-liquid separated. Examples of the second solid-liquid separation step include filtration. Aluminum phosphate obtained in the second solid-liquid separation step can be solid-liquid separated in a short time, and aluminum phosphate that has been solid-liquid separated is reused in the phosphorylation step.

The pH of the lithium salt aqueous solution obtained in the second solid-liquid separation step is preferably adjusted in a pH adjustment step (STEP 5*a*), which will be described later. Since the pH of the suspension has been adjusted to 2 to 3 in the pH adjustment step (STEP C), the pH of the lithium salt aqueous solution is 2 to 3, but the pH is preferably adjusted to 6 to 14, more preferably 6 to 8, in the pH adjustment step (STEP 5*a*). In this case, unreacted aluminum and phosphorus are precipitated, and the purity of the lithium salt aqueous solution becomes higher.

Preferably, a second electrolysis step (STEP 6*b*), which will be described later, is performed in which the lithium salt aqueous solution having pH adjusted in the pH adjustment step (STEP 5*a*) is electrolyzed using an ion exchange membrane to obtain a lithium hydroxide aqueous solution. The lithium salt aqueous solution may be concentrated in a first concentration step (STEP E) before being subjected to the second electrolysis step. The first concentration step can be carried out using, for example, a reverse osmosis membrane (RO membrane).

In the lithium phosphate method, the filtrate in which the alkali metal chloride is dissolved, separated in the first solid-liquid separation step, may be concentrated in a second concentration step (STEP 9), which will be described later.

(Evaporative Concentration Method in Third Embodiment)

The alkali metal mixed salt aqueous solution containing lithium and at least one selected from the group consisting of sodium and potassium is evaporatively concentrated, and at least one selected from the group consisting of a sodium salt and a potassium salt, such as at least one selected from the group consisting of sodium chloride and potassium chloride, is sequentially crystallized and separated from the alkali metal mixed salt aqueous solution. The at least one selected from the group consisting of a sodium salt and a potassium salt, such as at least one selected from the group consisting of sodium chloride and potassium chloride, that has been separated is dissolved in water, and a first electrolysis step (STEP 7*a*), which will be described later, is performed in which the aqueous solution of a salt of at least one selected from the group consisting of sodium and potassium is electrolyzed using an ion exchange membrane. The lithium salt aqueous solution from which at least one selected from the group consisting of a sodium salt and a potassium salt has been separated is preferably subjected to a pH adjustment step (STEP 5*a*) and a first concentration step (STEP E), both of which will be described later, in the same manner as for the lithium salt aqueous solution obtained by the lithium phosphate method, and subjected to a second electrolysis step (STEP 6*b*), which will be described later.

(Solvent Extraction Method in Third Embodiment)

The pH of a homogeneous mixed solution of the alkali metal mixed salt aqueous solution containing lithium and at least one selected from the group consisting of sodium and potassium and an organic solvent for lithium extraction is preferably adjusted to the range of 5 to 9 by addition of an alkali, such as at least one selected from the group consisting of sodium hydroxide and potassium hydroxide, and a lithium-containing organic phase and an aqueous solution of a salt of at least one selected from the group consisting of sodium and potassium as an extraction residual liquid are obtained. Examples of the organic solvent for lithium extraction include bis(2-ethylhexyl) hydrogen phosphate. Scrubbing with a mineral acid is performed on the lithium-containing organic phase, and a lithium salt aqueous solution is recovered. The lithium salt aqueous solution is preferably subjected to a pH adjustment step (STEP 5*a*) and a first concentration step (STEP E), both of which will be described later, in the same manner as for the lithium salt aqueous solution obtained by the lithium phosphate method, and subjected to a second electrolysis step (STEP 6*b*), which will be described later.

The first electrolysis step (STEP 7*a*) is performed in which the aqueous solution of a salt of at least one selected from the group consisting of sodium and potassium, in which at least one selected from the group consisting of a sodium salt and a potassium salt, such as at least one selected from the group consisting of sodium chloride and potassium chloride, is dissolved, from which lithium has been separated by extraction, is electrolyzed using an ion exchange membrane. The aqueous solution of a salt of at least one selected from the group consisting of sodium and potassium is preferably concentrated using a reverse osmosis membrane (RO membrane) or the like in a second concentration step (STEP 9), which will be described later.

<pH Adjustment Step for Lithium Salt Aqueous Solution>

The recovery method of the third embodiment may comprise a pH adjustment step (STEP 5*a*) in which at least one selected from the group consisting of lithium hydroxide and a lithium hydroxide aqueous solution is added to the lithium salt aqueous solution obtained in the separation step to adjust the pH of the lithium salt aqueous solution. The pH of the lithium salt aqueous solution is preferably adjusted to 6 to 14, and more preferably to 6 to 8.

<Concentration Step for Lithium Salt Aqueous Solution>

The recovery method of the third embodiment may comprise a first concentration step (STEP E) in which the lithium salt aqueous solution obtained in the separation step and, if necessary, subjected to the pH adjustment step (STEP 5*a*) is concentrated. The first concentration step can be carried out using, for example, a reverse osmosis membrane (RO membrane).

<Second Electrolysis Step>

The recovery method of the third embodiment comprises a second electrolysis step (STEP 6*b*) in which the lithium salt aqueous solution obtained in the separation step and, if necessary, subjected to at least one selected from the group consisting of the pH adjustment step (STEP 5*a*) and the first concentration step (STEP E) is electrolyzed using an ion exchange membrane to obtain a lithium hydroxide aqueous solution.

Figure 2:
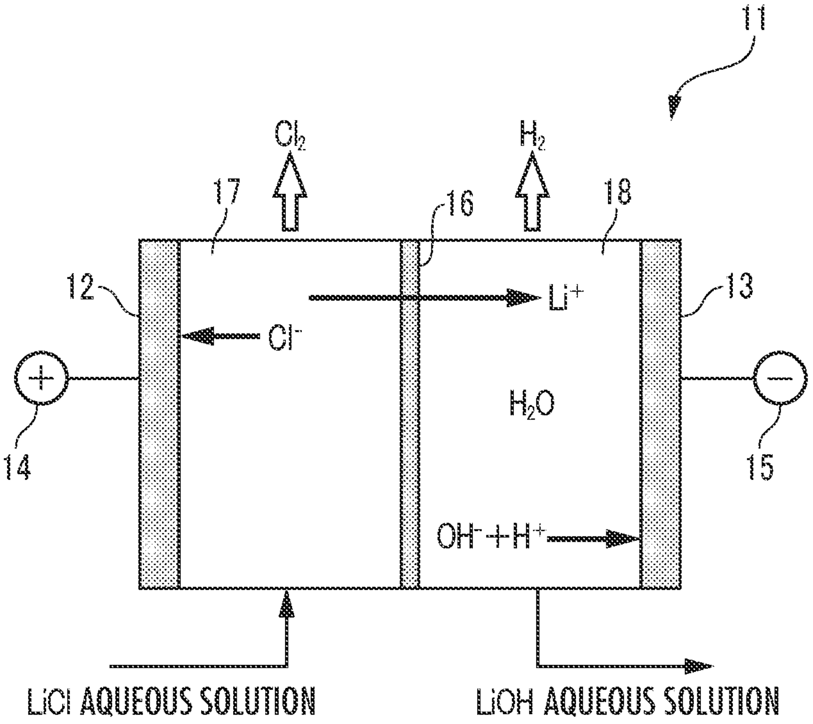
FIG. 2 is an explanatory cross-sectional view showing the structure of the ion exchange membrane electrolytic bath used in the method for recovering lithium from waste lithium-ion batteries of the first and third embodiments.

The second electrolysis step can be carried out using, for example, the electrolytic bath 11 shown in FIG. 2. The second electrolysis step is performed in the same manner as for the first electrolysis step. Although not shown in FIG. 3, in the case where the lithium chloride aqueous solution contains sulfate ions, sulfuric acid can be obtained in the anode chamber 17. In the case where the lithium chloride aqueous solution contains nitrate ions, nitric acid can be obtained in the anode chamber 17. That is, a mineral acid 4 can be obtained in the second electrolysis step, and the mineral acid 4 may be used for at least one of dissolution of the active material powder 1 in STEP 1 and pH adjustment in STEP C.

As the electric power required for the second electrolysis step, for example, renewable energy, preferably at least one selected from the group consisting of solar power generation and wind power generation, is used.

(Separation of Lithium Hydroxide Monohydrate)

The recovery method of the third embodiment may comprise a crystallization step (STEP F) in which the lithium hydroxide aqueous solution obtained in the second electrolysis step is evaporatively concentrated to crystallize lithium hydroxide monohydrate 8.

(Separation of Lithium Carbonate)

The recovery method of the third embodiment may comprise a carbonation step (STEP G) in which carbon dioxide is blown into the lithium hydroxide aqueous solution obtained in the second electrolysis step to produce lithium carbonate 6. An aqueous solution in which a lithium salt such as lithium chloride is dissolved, obtained by solid-liquid separating a slurry obtained in the carbonation step by filtration or the like, may be concentrated in the first concentration step (STEP E). Note that FIGS. 6 and 7 show the case where the lithium salt is lithium chloride.

<First Electrolysis Step>

The recovery method of the third embodiment comprises a first electrolysis step (STEP 7*a*) in which the aqueous solution of a salt of at least one selected from the group consisting of sodium and potassium in which, for example, at least one selected from the group consisting of sodium chloride and potassium chloride is dissolved, obtained in the separation step, is electrolyzed using an ion exchange membrane to obtain an alkali metal hydroxide aqueous solution. The first electrolysis step can be carried out using, for example, the electrolytic bath 11 shown in FIG. 5 in the same manner as for the first electrolysis step of the second embodiment.

In the case where the aqueous solution of a salt of at least one selected from the group consisting of sodium and potassium contains chloride ions, the hydrogen gas ($H_2$) and chlorine gas ($Cl_2$) produced in the first electrolysis step can be allowed to react with each other to obtain hydrochloric acid. Although not shown in FIG. 5, in the case where the aqueous solution of a salt of at least one selected from the group consisting of sodium and potassium contains sulfate ions, sulfuric acid can be obtained in the anode chamber 27. In the case where the aqueous solution of a salt of at least one selected from the group consisting of sodium and potassium contains nitrate ions, nitric acid can be obtained in the anode chamber 27. That is, a mineral acid 4 can be obtained in the first electrolysis step, and the mineral acid 4 is used for at least one selected from the group consisting of dissolution of the active material powder 1 in STEP 1 and pH adjustment in STEP C.

The alkali metal hydroxide aqueous solution produced in the first electrolysis step is reused in at least one step selected from the group consisting of the alkali metal hydroxide addition step, the extraction step, the separation step by the lithium phosphate method, and the separation step by the solvent extraction method.

In the first electrolysis step, the aqueous solution of a salt of at least one selected from the group consisting of sodium and potassium is electrolyzed, resulting in production of an aqueous solution of a salt of at least one selected from sodium and potassium that is more dilute than the aqueous solution of a salt of at least one selected from the group consisting of sodium and potassium. Then, the recovery method of the third embodiment may comprise a second concentration step (STEP 9) in which the dilute aqueous solution of a salt of at least one selected from the group consisting of sodium and potassium is concentrated and added to the aqueous solution of a salt of at least one selected from the group consisting of sodium and potassium obtained in the separation step. The second concentration step can be carried out using, for example, a reverse osmosis membrane (RO membrane).

As the electric power required for the first electrolysis step, for example, renewable energy, preferably at least one selected from the group consisting of solar power generation and wind power generation, is used.

EXAMPLES

Hereinafter, the present invention will be described in further detail based on Examples, but the present invention is not limited to them.

In Examples, various physical properties were measured or calculated as follows.

<Metal Content in Lithium and Sodium Mixed Salt Aqueous Solution and Content of Impurities in Lithium Carbonate>

Using Optima 8300 manufactured by PerkinElmer, Inc., the metal content in the lithium and sodium mixed salt aqueous solution and the content of impurities in lithium carbonate were measured with an inductively coupled plasma optical emission spectrometer (ICP-OES).

Example 1

Used lithium-ion batteries that have reached the end of their useful life as battery products were subjected to discharge treatment to discharge all remaining electric charges. Subsequently, the waste lithium-ion batteries were subjected to heating treatment (roasting) and then crushed with a hammer mill, and the housing, current collectors, and other components constituting the waste lithium-ion batteries were sieved to obtain active material powder. 500 g of the active material powder was dissolved in 3 L of 6 mol/L hydrochloric acid, and to the resulting solution was added 2.8 L of a 2 mol/L sodium hydroxide aqueous solution to neutralize the solution. 5.8 L of the neutralized solution and 5.8 L of bis(2,4,4-trimethylpentyl)phosphinic acid (Cyanex 272, the diluent was kerosene) as the extractant were mixed to solvent extract cobalt. To the mixed solution was added a 5 mol/L sodium hydroxide aqueous solution to adjust the pH to 4, and a cobalt-containing organic phase and a first extraction residual liquid were obtained. The cobalt-containing organic phase was scrubbed with dilute sulfinic acid and then back extracted with 1.5 mol/L sulfuric acid to obtain a cobalt sulfate solution. Using the same organic solvent as the organic solvent used in the cobalt extraction step, nickel was extracted from the first extraction residual liquid, and a lithium and sodium mixed salt aqueous solution was obtained as the extraction residual liquid. 3.5 g/L of lithium and 38.2 g/L of sodium were contained in the aqueous solution.

To 8.3 L of the aqueous solution was added 187 g of aluminum phosphate, followed by addition of sodium hydroxide to adjust the pH of the aqueous solution to 10.5, and the reaction was carried out for 2 hours to obtain a white slurry A. Next, the white slurry A was filtered and washed to obtain 614 g of a white cake A with a water content of 55%. The white cake A was suspended in 300 mL of pure water, 35 mass % hydrochloric acid was added to adjust the pH of the suspension to 2.5, and the suspension was heated to 60° C. to carry out the reaction for 6 hours, thereby obtaining a white slurry B. The white shurry B was filtered and washed to obtain 467 g of a white cake B with a water content of 60% and a total of 1060 mL of the filtrate and washing water. Sodium hydroxide was added to 1060 mL of the filtrate and washing water to adjust the pH to 7, the mixture was filtered, and 680 g of a 35 mass % sodium carbonate aqueous solution was added to the resulting filtrate, which was heated to 60° C. to carry out the reaction for 1 hour. The resulting solids were filtered and washed to obtain hydrous lithium carbonate. The hydrous lithium carbonate was dried at 500° C. for 4 hours to obtain 129 g of lithium carbonate. The recovery rate of lithium was 83.5%. In the lithium carbonate, the content of sodium was less than 200 ppm, the content of aluminum was less than 10 ppm, the content of phosphorus was less than 10 ppm, and the content of water was less than 0.1% by mass.

10.5 L of the filtrate and washing water obtained by filtration and washing of the white slurry A (the sodium chloride concentration was 98 g/L) was concentrated using the RO membrane, and the resulting sodium chloride aqueous solution (the sodium chloride concentration was 300 g/L) was electrolyzed using an ion exchange membrane (Nafion N324 manufactured by The Chemours Company) under the conditions of a current density of 40 A/dm$^2$, an electrode area of 1.75 dm$^2$, and an energization time of 4 hours (the first electrolysis step) to obtain 1.6 kg of 21.2 mass % sodium hydroxide. Furthermore, by allowing the reaction product of the produced chlorine gas and hydrogen gas to be absorbed into water. 1.04 kg of 30 mass % hydrochloric acid was also obtained.

Sodium hydroxide produced in the first electrolysis step could be reused in the sodium hydroxide addition step (STEP 2), the extraction step (STEP 3), and the separation step (STEP 4). Furthermore, hydrochloric acid synthesized in the first electrolysis step could be reused in the dissolution step (STEP 1). The current efficiency in the first electrolysis step was 81.5%.

In Example 1, it was found that the mineral acid and alkali used could be regenerated and reused. Furthermore, it was also found that the purity of lithium carbonate obtained in the final stage of lithium recovery from waste lithium-ion batteries and the recovery rate of lithium were very high.

Example 2

Used lithium-ion batteries that have reached the end of their useful life as battery products were subjected to discharge treatment to discharge all remaining electric charges. Subsequently, the waste lithium-ion batteries were subjected to heating treatment (roasting) and then crushed with a hammer mill, and the housing, current collectors, and other components constituting the waste lithium-ion batteries were sieved to obtain active material powder. 500 g of the active material powder was dissolved in 3 L of 6 mol/L hydrochloric acid, and to the resulting solution was added 2.8 L of a 2 mol/L sodium hydroxide aqueous solution to neutralize the solution. 5.8 L of the neutralized solution and 5.8 L of bis(2,4,4-trimethylpentyl)phosphinic acid (Cyanex 272, the diluent was kerosene) as the extractant were mixed to solvent extract cobalt. To the mixed solution was added a 5 mol/L sodium hydroxide aqueous solution to adjust the pH to 4, and a cobalt-containing organic phase and a first extraction residual liquid were obtained. The cobalt-containing organic phase was scrubbed with dilute sulfuric acid and then back extracted with 1.5 mol/L sulfuric acid to obtain a cobalt sulfate solution. Using the same organic solvent as the organic solvent used in the cobalt extraction step, nickel was extracted from the first extraction residual liquid, and a lithium and sodium mixed salt aqueous solution was obtained as the extraction residual liquid. 3.5 g/L of lithium and 38.2 g/L of sodium were contained in the aqueous solution.

To 8.3 L of the aqueous solution was added 187 g of aluminum phosphate, followed by addition of sodium hydroxide to adjust the pH of the aqueous solution to 10.5, and the reaction was carried out for 2 hours to obtain a white slurry A. Next, the white slurry A was filtered and washed to obtain 614 g of a white cake A with a water content of 55%. The white cake A was suspended in 300 mL of pure water, 35 mass % hydrochloric acid was added to adjust the pH of the suspension to 2.5, and the suspension was heated to 60° C. to carry out the reaction for 6 hours, thereby obtaining a white slurry B. The white slurry B was filtered and washed to obtain 467 g of a white cake B with a water content of 60% and a total of 1060 mL of the filtrate and washing water. Lithium hydroxide was added to 1060 mL of the filtrate and washing water to adjust the pH to 7, the mixture was filtered, and 1060 mL of the resulting filtrate (filtrate 1) (the lithium chloride concentration was 92 g/L) was concentrated using the RO membrane. The resulting lithium chloride aqueous solution (the lithium chloride concentration was 200 g/L) was electrolyzed using an ion exchange membrane (Nafion N324 manufactured by The Chemours Company) under the conditions of a current density of 40 $A/dm^2$ and an electrode area of 0.7 $dm^2$ (the second electrolysis step) to obtain 1100 g of a 6.2 mass % lithium hydroxide aqueous solution. Furthermore, by allowing the reaction product of the produced chlorine gas and hydrogen gas to be absorbed into water, 350 g of 30 mass % hydrochloric acid was also obtained. The recovery rate of lithium in the second electrolysis step was 70.3%.

380 g of the 6.2 mass % lithium hydroxide aqueous solution was fractionated, and 80% by mass of the aqueous solution was crystallized to obtain 19.3 g (mass after drying) of crystals of lithium hydroxide monohydrate. In the lithium hydroxide monohydrate, the content of sodium was less than 50 ppm, the content of aluminum was less than 10 ppm, and the content of phosphorus was less than 10 ppm.

10.5 L of the filtrate and washing water obtained by filtration and washing of the white slurry A (the sodium chloride concentration was 98 g/L) was concentrated using the RO membrane, and the resulting sodium chloride aqueous solution (the sodium chloride concentration was 300 g/L) was electrolyzed using an ion exchange membrane (Nafion N324 manufactured by The Chemours Company) under the conditions of a current density of 40 $A/dm^2$, an electrode area of 1.75 $dm^2$, and an energization time of 4 hours (the first electrolysis step) to obtain 1.6 kg of 21.2 mass % sodium hydroxide. Furthermore, by allowing the reaction product of the produced chlorine gas and hydrogen gas to be absorbed into water, 1.04 kg of 30 mass % hydrochloric acid was also obtained.

Sodium hydroxide produced in the first electrolysis step could be reused in the sodium hydroxide addition step (STEP 2), the extraction step (STEP 3), and the separation step (STEP 4). Furthermore, hydrochloric acid synthesized in the first electrolysis step could be reused in the dissolution step (STEP 1). The current efficiency in the first electrolysis step was 81.5%.

In Example 2, it was found that the mineral acid and alkali used could be regenerated and reused. Furthermore, it was also found that the purity of lithium hydroxide monohydrate obtained in the final stage of lithium recovery from waste lithium-ion batteries and the recovery rate of lithium were very high.

In the recovery method of the present invention, the alkali metal hydroxide can be obtained directly in the first and second electrolysis steps for the alkali metal salt aqueous solution, using an ion exchange membrane. The mineral acid and alkali produced in these electrolysis steps can be circulated and utilized in the recovery method of the present invention, which enables a closed-loop recycling process. Furthermore, since the mineral acid and alkali are circulated and utilized in the recovery method of the present invention, the amount of carbon dioxide emissions generated in the distribution process for the mineral acid and alkali can be reduced compared to the case where the mineral acid and alkali are purchased from outside as has been done conventionally.

REFERENCE SIGNS LIST

1 Active material powder
2 Metal sulfate aqueous solution
3 Lithium hydroxide aqueous solution
4 Mineral acid
5 Sodium hydroxide aqueous solution
6 Lithium carbonate
7 Sodium carbonate
8 Lithium hydroxide monohydrate
11 Electrolytic bath
16 Ion exchange membrane

The invention claimed is:

1. A method for recovering lithium from waste lithium-ion batteries, the method comprising:

a dissolution step of dissolving active material powder obtained by pre-processing waste lithium-ion batteries in a mineral acid to obtain an acid solution of the active material containing at least lithium;

an alkali metal hydroxide addition step of adding an alkali metal hydroxide to the acid solution obtained in the dissolution step;

an extraction step of separating at least one metal excluding alkali metals, out of metals contained in the active material powder, from the acid solution obtained in the alkali metal hydroxide addition step by solvent extraction to obtain a first alkali metal salt aqueous solution; and a first electrolysis step of electrolyzing the first alkali metal salt aqueous solution using an ion exchange membrane to obtain an alkali metal hydroxide aqueous solution, an acid, and a second alkali metal salt aqueous solution that is more dilute than the first alkali metal salt aqueous solution, wherein the alkali metal hydroxide aqueous solution obtained in the first electrolysis step is reused in at least one selected from the group consisting of the alkali metal hydroxide addition step and the extraction step, and at least one selected from the group consisting of a mineral acid obtained by recovering gas produced in the first electrolysis step and a mineral acid obtained in an anode chamber of the first electrolysis step is reused in the dissolution step.

2. The method for recovering lithium from waste lithium-ion batteries according to claim 1, wherein the alkali metal hydroxide is lithium hydroxide.

3. The method for recovering lithium from waste lithium-ion batteries according to claim 1, wherein the alkali metal hydroxide is at least one selected from the group consisting of sodium hydroxide and potassium hydroxide, the method further comprises a separation step of separating each of a lithium salt and a salt of at least one selected from the group consisting of sodium and potassium from an alkali mixed salt aqueous solution obtained in the extraction step as a residual liquid of the solvent extraction, and the alkali metal hydroxide aqueous solution obtained in the first electrolysis step is reused in at least one selected from the group consisting of the alkali metal hydroxide addition step, the extraction step, and the separation step.

4. The method for recovering lithium from waste lithium-ion batteries according to claim 3, further comprising at least one selected from the group consisting of a second electrolysis step of electrolyzing a lithium salt aqueous solution obtained in the separation step using an ion exchange membrane to obtain a lithium hydroxide aqueous solution, and a carbonation step of carbonating a lithium salt aqueous solution obtained in the separation step to obtain lithium carbonate.

5. The method for recovering lithium from waste lithium-ion batteries according to claim 3, wherein the separation step is carried out by at least one of a lithium phosphate method, an evaporative concentration method, and a solvent extraction method.

6. The method for recovering lithium from waste lithium-ion batteries according to claim 4, wherein the separation step is carried out by at least one of a lithium phosphate method, an evaporative concentration method, and a solvent extraction method.

7. The method for recovering lithium from waste lithium-ion batteries according to claim 1, wherein the second alkali metal salt aqueous solution is concentrated and added to the first alkali metal salt aqueous solution.

8. The method for recovering lithium from waste lithium-ion batteries according to claim 1, wherein the mineral acid includes at least one acid selected from the group consisting of hydrochloric acid, sulfuric acid, and nitric acid.

9. The method for recovering lithium from waste lithium-ion batteries according to claim 8, wherein the mineral acid includes hydrochloric acid.

10. The method for recovering lithium from waste lithium-ion batteries according to claim 1, wherein electric power used for at least one selected from the group consisting of the first electrolysis step and the second electrolysis step includes electric power obtained by renewable energy.

11. The method for recovering lithium from waste lithium-ion batteries according to claim 10, wherein the electric power obtained by renewable energy includes at least one selected from the group consisting of electric power obtained by solar power generation and electric power obtained by wind power generation.

* * * * *